US007199725B2

United States Patent
Gilfix et al.

(10) Patent No.: US 7,199,725 B2
(45) Date of Patent: Apr. 3, 2007

(54) RADIO FREQUENCY IDENTIFICATION AIDING THE VISUALLY IMPAIRED WITH SYNCHRONOUS SOUND SKINS

(75) Inventors: Michael Gilfix, Austin, TX (US); Jerry Walter Malcolm, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 10/703,757

(22) Filed: Nov. 6, 2003

(65) Prior Publication Data

US 2005/0099318 A1  May 12, 2005

(51) Int. Cl.
 G08B 3/10 (2006.01)
 G08G 1/005 (2006.01)
 G09B 21/00 (2006.01)

(52) U.S. Cl. ............................. 340/825.19; 340/573.1; 340/825.49; 340/944; 235/375; 704/271

(58) Field of Classification Search .......... 340/825.19, 340/825.49, 572.1, 944, 573.1; 235/375, 235/462.44–462.46

See application file for complete search history.

(56) References Cited

U.S. PATENT DOCUMENTS

| | | | |
|---|---|---|---|
| 5,973,618 A * | 10/1999 | Ellis ........................... | 340/990 |
| 2002/0121986 A1* | 9/2002 | Krukowski et al. ..... | 340/825.19 |
| 2003/0155413 A1* | 8/2003 | Kovesdi et al. ............. | 235/375 |
| 2004/0133919 A1* | 7/2004 | Incentis ....................... | 725/112 |
| 2005/0096084 A1* | 5/2005 | Pohja et al. ............. | 455/556.1 |

* cited by examiner

*Primary Examiner*—Jeffery Hofsass
*Assistant Examiner*—Anne V. Lai
(74) *Attorney, Agent, or Firm*—Diana L. Roberts-Gerhardt; John Biggers; Biggers & Ohanian, LLP

(57) ABSTRACT

Methods, systems, and products for radio frequency identification aiding the visually impaired, storing a recording of a sound, including timing information for synchronous playback, representing at least one attribute of an object having associated with the object a radio frequency identification ("RFID") tag; activating the RFID tag with an electronic travel aid ("ETA") for the visually impaired; retrieving the recording from storage; and playing the recording synchronously through an audio interface of the ETA. Storage of sound recording may be local or remote, and sound recordings may be sorted or indexed and retrieved from storage according to an RFID tag identification code, a classification code for the object, and a type code (a sound skin identifier) for the recording.

15 Claims, 10 Drawing Sheets

RADIO FREQUENCY IDENTIFICATION AIDING THE VISUALLY IMPAIRED WITH SYNCHRONOUS SOUND SKINS

BACKGROUND OF THE INVENTION

1. Field of the Invention

The field of the invention is data processing, or, more specifically, methods, systems, and products for radio frequency identification aiding the visually impaired.

2. Description of Related Art

Traditional primary travel aids for the visually impaired include guide dogs and long canes. Secondary aids include such electronic travel aids ("ETAs") as laser canes and sonar-based devices such as the well-known Sonic Guide™ and Sonic Pathfinder™. All have limitations. One limitation of prior art travel aids is that they provide little or no information regarding a user's orientation with respect to the general environment. The advent of global positioning systems and cellular telephone networks offers some hope of delivering to blind users pedestrian information describing location and general environment with accuracy, but cost effective devices for general orientation with blind-friendly displays are not generally available.

Prior art devices also have limitations regarding orientation with respect to a local environment and with the detection of hazards not detected by the use of a primary mobility aid. Long cane users, for example, find it difficult to maintain a straight travel path without some additional information regarding the local environment. Long cane users with good hearing may manage straight line travel along the side of a road carrying traffic and in some cases when walking along a wall listening to the echo of their cane and their foot steps. Some blind cane users may rely on cane contact with the 'shore' line or side curb, a cane technique sometimes called 'touch and drag.' Guide dog users often are almost completely ignorant of the features which border their routes. A guide dog is very good at navigating a blind person through a local environment without contact with or knowledge of the surroundings.

In terms of detection of local obstacles, prior art travel aids for the visually impaired have limitations. The long cane will not detect hazards above waist height unless the hazards continues down to the ground. Sonic-based guides are not good at detecting objects that do not reflect sound well, and some of them are practically useless indoors. In addition, it is important to remember that all independent travel is goal directed. Blind persons must not only avoid things, they must also find things. Prior art devices are generally unable to indicate the nature of objects in the environment or the location of objects farther away than the length of a cane. For all these reasons, there is a definite need for improvements in the field of travel aids for the visually impaired.

SUMMARY OF THE INVENTION

A visually impaired person is empowered to operate an ETA according to embodiments of the present invention to activate RFID tags associated with objects in the user's travel environment. The ETA uses data from the RFID tag to retrieve sound recordings or audio clips representing objects, or attributes of objects, in the user's travel environment. The sound recordings have timing information for synchronous playback. Sounds representing objects may be grouped, by use of sound recording type codes or skin identifiers, in related groups called 'skins.' In this way, a user, upon entering a particular travel environment and using an ETA to retrieve and play audio clips representing objects in the environment is presented with a synchronous playback of sounds representing objects in the environment.

ETAs according to embodiments of the present invention typically utilize multi-channel playback adapters, in some embodiments comprising a multitimbral MIDI synthesizer, in other embodiments a multi-channel digital audio player, so that a multiplicity of sounds may be played back at the same time, that is, 'synchronously,' thereby providing timing efficiency with respect to mere serial playback. A user entering an environment in which sound recordings are grouped, for example, in a 'Sousa' skin, may be presented with playback of a Sousa march in which the trombone part, the trumpet part, and the clarinet part represent respectively the presence in a room of a chair, a sofa, and a hanging plant. Each musical part in this example taken separately represents the presence of a particular object. The exemplary musical parts, however, are played back synchronously, presenting an apparent playback of a piece of music in which the musical parts are played in correct time with one another. In this way, a visually impaired user is presented with a synchronous display of information regarding a travel environment, information presented in a form chosen by the user as a pleasant experience for the user. The information presented includes representations of objects at positions in the environment beyond the reach of a long cane and objects whose existence in the environment would never be known to the user of a guide dog.

More particularly, methods, systems, and products are disclosed for radio frequency identification aiding the visually impaired that include storing a recording of a sound representing at least one attribute of an object having associated with the object a radio frequency identification ("RFID") tag, where the recording includes timing information for synchronous playback. Typical embodiments also include activating the RFID tag with an electronic travel aid ("ETA") for the visually impaired; retrieving the recording from storage; and playing the recording synchronously through an audio interface of the ETA. In many embodiments, playing the recording synchronously includes playing the recording in accordance with the timing information. Typical embodiments also include playing a plurality of recordings synchronously through the audio interface of the ETA.

In many embodiments, timing information includes a playback rate and playing a recording synchronously is carried out by measuring elapsed playback time and selecting a start time in advance of a current elapsed playback time. Such embodiments typically also include identifying, in dependence upon the selected start time and the playback rate, a start point in the recording that corresponds to the selected start time, and, when the elapsed playback time matches the selected start time, beginning playback of the recording from the start point.

In many embodiments, storing a recording of a sound includes storing the recording as a MIDI channel number and a MIDI sequence; retrieving the recording from storage is carried out by retrieving the MIDI sequence and the MIDI channel number; and playing the recording includes instructing a MIDI sequencer to turn on a MIDI channel identified by the MIDI channel number and sending the MIDI sequence through the sequencer to a multitimbral MIDI synthesizer.

In some embodiments where storing a recording of a sound includes storing the recording as a MIDI channel number and a MIDI sequence, the embodiments include storing on the RFID tag a classification code for the object and a type code for the recording. In such embodiments, activating the RFID tag typically includes receiving from the RFID tag in the ETA the classification code for the object and the type code for the recording. In such embodiments, retrieving the recording from storage includes retrieving the MIDI sequence and the MIDI channel number in dependence upon the classification code for the object and the type code for the recording, and playing the recording is carried out by instructing a MIDI sequencer to turn on a MIDI channel identified by the MIDI channel number and sending the MIDI sequence through the sequencer to a multitimbral MIDI synthesizer.

The other embodiments where storing a recording of a sound includes storing the recording as a MIDI channel number and a MIDI sequence, the embodiments also include storing on the RFID tag a classification code for the object and storing in the ETA a type code for the recording. In such embodiments, activating the RFID tag includes receiving from the RFID tag in the ETA the classification code for the object; retrieving the recording from storage includes retrieving the MIDI sequence and the MIDI channel number in dependence upon the classification code for the object and the type code for the recording; and playing the recording is carried out by instructing a MIDI sequencer to turn on a MIDI channel identified by the MIDI channel number and sending the MIDI sequence through the sequencer to a multitimbral MIDI synthesizer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for radio frequency identification aiding the visually impaired. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

RFID Aiding the Visually Impaired

Figure 1:
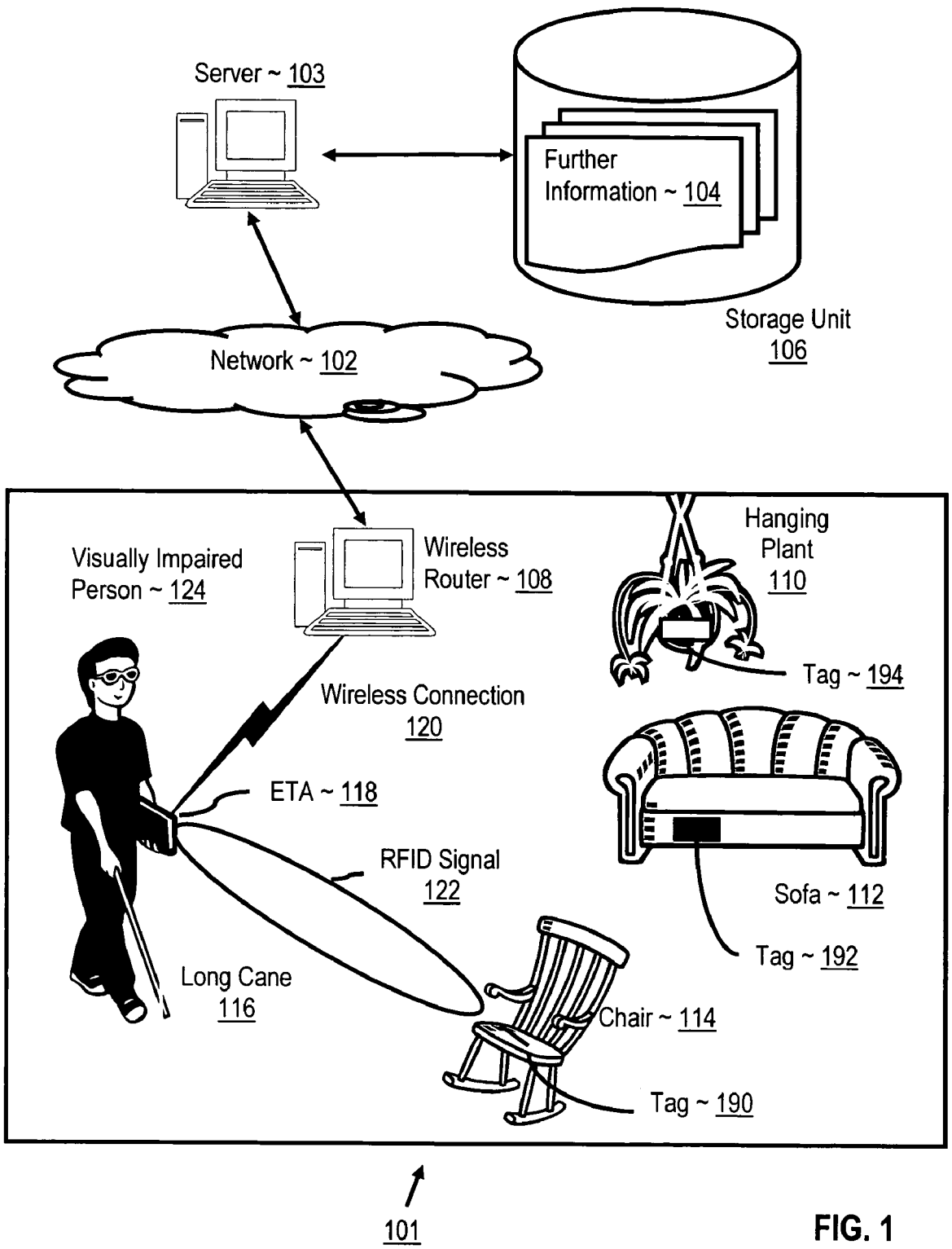
FIG. 1 illustrates a system for use of an ETA according to embodiments of the present invention.

Exemplary methods, systems, and products for radio frequency identification ("RFID") aiding the visually impaired are now explained with reference to the drawings, beginning with FIG. 1. FIG. 1 illustrates a system for use of an ETA according to embodiments of the present invention. In the example of FIG. 1, recordings (104) of sounds representing attributes of objects having associated with them a radio frequency identification ("RFID") tag are stored in storage unit (106).

Sound recordings according to embodiments of the present invention are sometimes referred to in this specification as 'audio clips.' Although the use of analog recordings is within the scope of the present invention, the sound recordings (104) or audio clips are typically digital recordings stored in any digital recording format deemed useful to those of skill in the art. One example of such a format is 'WAV,' the standard format for use with computers running under the Microsoft Windows™ operating system. Another example of a digital recording format is 'MP3,' which is an abbreviation of 'Motion Picture Experts Group, Audio layer 3.' A further example of a recording format useful for sound recordings in various embodiments of the present invention is 'MIDI,' the 'Musical Instrument Digital Interface.'

Sound recordings according to embodiments of the present invention include timing information for synchronous playback. To the extent that an embodiment utilizes a digital recording format such as WAV or MP3, timing information may comprise a playback rate, or storing a recording of a sound may include inserting 'time stamps' that identify the time after the beginning of playback when parts of such recordings may be played played back, so as to render their playback synchronous. In fact, throughout this specification, the term 'synchronous' refers to playing sound recordings in accordance with the timing information. In addition, because visually impaired users will often encounter at the same time multiple objects having associated RFID tags that identify recordings representing the objects, the term 'synchronous' also describes playing a plurality of recordings synchronously through the audio interface of the ETA, that is, playing more than one recording simultaneously and synchronously.

As mentioned above, MIDI format is useful according to various embodiments of the present invention. The MIDI format is useful in this context because the MIDI specification provides a standardized method for handing time-stamped MIDI data. The standardized file format for time-stamped MIDI data allows various applications, such as sequencers, scoring packages, multimedia presentation software, as well as ETAs according to the present invention, to share and administer MIDI data synchronously.

The MIDI standard defines formats for aggregations of MIDI data referred to as 'files.' The MIDI standard defines a data communications protocol that communicates sound playback data to MIDI-enabled devices such as sequencers and synthesizers. MIDI data therefore is comprised of a sequence of MIDI messages, sometimes stored in files, sometimes communicated through a data stream, but always including a sequence of MIDI messages. For this reason, MIDI data is often referred to in this specification as a 'MIDI sequence.'

In a MIDI sequence, timing information for synchronous playback is communicated in 'Timing Clock' messages. The Timing Clock message is the master clock that sets the tempo for playback of a MIDI sequence. In the MIDI standard, the Timing Clock messages is sent 24 times per quarter note. To support accurate timing, Timing Clock messages are given priority over other messages in a MIDI sequence. Timing Clock messages may occur anywhere in MIDI data, even between the bytes comprising other message types.

A MIDI sequence is communicated in a single unidirectional bit stream that is divided into logical channels by the inclusion of a digitally encoded channel number in many MIDI messages. A musical part is typically recorded on one channel. In the example of the musical parts for the environment of FIG. 1, the trombones may be recorded on MIDI channel 1, the clarinets on channel 2, and the trumpets on channel 3. When such a multi-channel MIDI sequence is to be played back synchronously, it is useful to play the sequence back through a multitimbral synthesizer or sound module. A 'multitimbral' synthesizer is capable of playing several different parts simultaneously. A single multitimbral sound module or synthesizer, in this example, may be configured to receive the trombone part on MIDI channel 1, the clarinet part on channel 2, and the trumpet part on channel 3.

A MIDI sequencer is a device that is capable of storing, editing, combining, and replaying MIDI data sequences. Output from a MIDI sequencer would typically be connected to the MIDI input of a MIDI-enabled synthesizer, sometimes referred to as a 'sound generator' or 'sound module.' The synthesizer receives a MIDI sequence and responds to the MIDI messages in the MIDI sequence by playing sounds. In typical embodiments of ETAs according to the present invention, the control functionality of a sequencer and the sound generation functionality of a multitimbral synthesizer are usefully combined into a single multi-channel output interface adapter, referred to in this specification as a 'MIDI adapter.'

In the example of FIG. 1, a visually impaired person (124) uses a long cane (116) as a primary travel aid supplemented by an ETA (118) according to embodiments of the present invention as a secondary travel aid. In this example, the visually impaired person is in a local environment (101) that includes a chair (114), a sofa (112), and a hanging plant (110). Such a local environment may be represented by a room in a residence, a public coffee shop, a reception area in an office building, and many others as will occur to those of skill in the art.

The chair, sofa, and hanging plant each has an RFID device called a 'tag' associated with it. The chair (114) has an RFID tag (190) embedded in the seat of the chair. The sofa (112) has an RFID tag (192) embedded in the upholstery of the sofa. The hanging plant (110) has an RFID tag (110) attached to its container. ETA (118) contains an RFID reader that can receive from each RFID tag information that describes the object with which the tag is associated.

"RFID" means Radio Frequency Identification, a technology for identifying objects by use of an antenna, a transceiver, and a transponder or 'tag.' RFID transceivers are treated in this specification as including the electronic devices needed to convert the information in a radio signal into useful computer data; in this specification, therefore, RFID transceivers are referred to as "RFID readers." As the term 'transceiver' implies, however, RFID readers may read and write information to and from RFID transponders. RFID transponders are referred to in this specification as "RFID tags." RFID tags are programmed with RFID identification codes unique to each RFID tag.

An RFID antenna emits radio signals to activate an RFID tag and read and write data to and from the tag. Antennas act as data conduits between tags and transceivers or RFID readers. Antennas are available in a variety of shapes and sizes. ETA (118) includes a directional antenna packaged with it, built into its case, for portable, handheld use. An RFID reader in ETA (118) typically emits radio waves at power levels and at frequencies that are useful at ranges of anywhere from a few inches to 100 feet or more. When an RFID tag (114) passes through the electromagnetic field of a radio signal from an RFID antenna, the RFID tag detects the reader's activation signal. The reader decodes the data encoded in the tag's integrated circuit, typically a silicon chip.

An RFID device that did not actively transmit to a reader was traditionally known as a 'tag.' An RFID device that actively transmitted to a reader was known as a transponder (TRANSmitter+resPONDER). It has become common in the industry, however, to interchange terminology and refer these devices as either tags or transponders more or less interchangeably. In this specification, for clarity of usage, the term 'tag' is used to refer generally to all RFID devices.

Tags are programmed with data that identifies the tag and therefore the item or object to which the tag is attached, inserted, embedded, or otherwise associated. Tags can be either read-only, volatile read/write, or write once/read many ("WORM") and can be either active or passive. Active tags generally use batteries to power the tag's radio transmitter and receiver. Active tags generally contain more components than do passive tags, so active tags are usually larger in size and more expensive than passive tag. An active tag's memory size varies according to application requirements; some systems operate with up to a megabyte or more of memory. The useful life of an active tag is related to its battery life. Passive tags can be either battery or non-battery operated, according to their intended applications.

Passive tags reflect the RF signal transmitted to them from a reader and add information by modulating the reflected signal to convey identifying or descriptive information stored in computer memory in the tag. A passive tag having a battery usually does not use its battery to boost the energy of the reflected signal. A passive tag typically would use a battery to maintain memory in the tag or power the electronics that enable the tag to modulate the reflected signal. Passive RFID tags often operate without a battery or other power source, obtaining operating power generated from an RFID reader. Passive tags are typically much lighter than active tags, less expensive, and offer a very long operational lifetime. The trade off is that passive RFID tags have shorter read ranges than active tags and require a higher-powered reader.

RFID tags come in a wide variety of shapes and sizes. Animal tracking tags, inserted beneath an animal's skin, can be as small as a pencil lead in diameter and one-half inch in length. Some tags are screw-shaped to identify trees or wooden items, or credit-card shaped for use in access applications. The anti-theft hard plastic tags attached to merchandise in stores are RFID tags.

In the example of FIG. 1, RFID signal (122), transmitted from an RFID reader in ETA (118), activates RFID tag (190), a small form-factor, passive tag embedded in the seat of chair (114). Tag (190) has stored in computer memory within it at least one unique identifications code or serial number that uniquely identifies the tag.

More and more manufacturers include RFID tags in manufactured items, for life cycle monitoring, anti-theft purposes, maintenance aids, and so on. As RFID tags become more common in items of manufacture, a new aid to the blind may be effected by including in tags in manufactured items classification codes for objects with which the tags are to be associated or a type code for a sound recording representing an attribute of an object. Predefined sets of classification codes for objects and type codes for sounds may be predefined by standards organizations, so that the same codes are used by many or all manufacturers. In this way, an ETA according to embodiments of the present invention may be manufactured that will work with objects and sound recordings manufactured or provided from any source.

In the example of FIG. 1, ETA (118) contains an RFID reader capable of receiving from tag (190) an identification code for the tag, a classification code for the object (the chair), or a type code for a recording. Upon receiving the identification code for the tag, and optionally also a classification code for the chair or) or a type code for a recording, ETA (118) retrieves a recording from storage and plays the recording through an audio interface of the ETA. The audio interface may be multi-channel so as to support playback of more than one audio clip at the same time and may include a speaker or headphones. The audio clips are usefully recorded in the form of MIDI messages in multi-channel MIDI sequence, where each channel encodes one clip.

Although the sound recordings (104) in the example of FIG. 1 are shown stored in a location that is remote from the ETA and the environment in which the ETA is currently operating, that is not a limitation of the invention. In fact, sound recordings or audio clips, given sufficient memory, may also be stored in RFID tags or in the ETA itself. One of the advantages of the MIDI format, in fact, is that a recording in the form of a MIDI sequence is much smaller in terms of memory required for storage than is the same recording in the form digitized audio such as WAV or MP3. Audio clips may be stored in an ETA in magnetic memory as, for example, a microdrive, in read-only memory ("ROM"), in electrically erasable programmable read only memory ("EEPROM" or 'flash memory'), and in other ways as will occur to those of skill in the art. In cases where only a single audio clip is stored on an RFID tag embedded in or affixed to an object, then determining which audio clip to play to represent the object or an attribute of the object is the trivial case: there is only one to choose from.

All storage locations for sound recordings, given sufficient memory, are capable of storing more than one sound recording, therefore presenting the question which one or more of the recorded clips are to be played at any particular time. Many ETAs according to the present invention therefore are programmed to retrieve a particular audio clip from storage in dependence upon a classification code for an object with which an RFID tag is associated and a type code for sound recordings. In effect, the type code for sound recordings typically implements a grouping referred to in this specification as a 'sound skin.' By providing both an object classification code and a sound recording type code, ETAs according to the present invention infer that for a particular object, a particular audio clip is to be played.

If, for example, a sound recording type code identifies a sound skin for nature sounds, and an object classification code identifies an object as a chair, an ETA may retrieve an audio clip of a chirping cricket, the sound recording that represents the presence of a chair in the 'nature sounds' sound skin. Change the sound skin, the value of the sound recoding type code, and the sound recording retrieved and played to represent the presence of the chair may be a French horn passage from a classical music skin or a lawn mower noise from a suburban living skin.

The largest store of memory available for storing sound recording may be remote storage on large databases, and recordings from storage therefore is often carried out, as shown in FIG. 1, by retrieving sound recordings through a network (102) from a remote store (106) of such sound recordings (104). In the example of FIG. 1, ETA (118) includes a wireless communications adapter capable of effecting a data communications connection with wireless router (108). A useful aspect of mobile computing is the fast growing use of wireless routers or wireless access points, sometimes known as 'hot spots,' which allow portable computer users to function on the move. Hot spots are found now in coffee shops, hotels, lounges, book stores, restaurants, airports, and so on. Wireless router (108) represents such a hot spot, presenting the availability of convenient data communications to ETA (118) and its user (124).

Although the example of a data communications connection to retrieve sound recording remotely is represented in FIG. 1 as a wireless connection, in fact, that is not a limitation of the present invention. Wired Internet connections, for example, are available in many public and private environments such as hotel rooms, offices, and so on, and ETA (118) is advantageously and optionally also implemented with a wired communications adapter, such as, for example, an Ethernet adapter, for use with wired data communications connections.

ETA (118) is programmed to carry out data communications to retrieve sound recordings (104) from storage unit (106) by transmitting messages formulated according to a data communication protocol which may be, for example, HTTP (HyperText Transport Protocol), WAP (Wireless Access Protocol), HDTP (Handheld Device Transfer Protocol), or others as will occur to those of skill in the art. ETA (118) in this example communicates with storage unit (106) through server (103) which provides server-side functionality for database access in the form of Java servlets, CGI (Common Gateway Interface) scripts, or other server-side facilities for computer resource management as will occur to those of skill in the art.

Server-side functionality such as a Java servlet or a CGI script for retrieving particular sound recordings (104) are identified by ETA (118) by use of URLs (Uniform Resource Locators) or URIs (Uniform Resource Identifiers), and the ETA transmits a data communications protocol message to a server-side function identified by such a URL or URI bearing at least one unique identification code encoded as 'form data.' In the example of FIG. 1, the server-side functionality supported by server (103) comprises an on-line service for use by ETAs and the visually impaired. The on-line service is accessed at a cyberspace location, that is, a network address, identified by a URL or URI. That URL or URI is stored in RAM or non-volatile memory in ETA (118) as a setup parameter for ETA (118) and used by the ETA (118) in its data communications functions.

Because memory size in an ETA or RFID is likely to be limited with respect to remote memory size in cyberspace, it will occur to readers to ask how a manufacturer of an ETA or RFID may know which sound recordings to store. Which objects will a visually impaired user encounter in travel for which an ETA will need a representative sound recording? In remote storage, in contrast with local storage in an ETA or an RFID, sound recordings may be stored for all objects and for all skins. That is, manufacturers may provide database-oriented web sites where a purchaser of an object bearing an embedded RFID tag may log on and store sound recordings representing the object, multiple sound recordings for the object, one for every known skin type or recording type code. Having huge memory resources, it is entirely feasible for such web sites to implement storage for all sound recordings for all skins for all objects bearing RFID tags.

In storage in an ETA, however, audio clips clearly cannot be stored for all objects for all skins. Storage in an ETA nevertheless is advantageous when a developer of an ETA can identify a relatively limited set of objects that may usefully be tagged as an aid to the visually impaired. Examples include an ETA developed as a travel aid through a museum, a concert hall, an airport or train terminal, for example. Other examples include any public place where secondary travel aids for the visually impaired are likely to be needed and particularly such public places where wireless hot spots are not available.

In the example of FIG. 1, ETA (118) transmits RFID signal (122) through an antenna (not shown on FIG. 1). In an environment where several objects are present with RFID tags, an omni-directional antenna may activate more than one RFID tag at the same time, thereby presenting a risk of interference or confusion. ETA (118) therefore preferably includes a directional antenna. Implementing an ETA with a directional antenna also supports inferring an approximate direction to an object in dependence upon the orientation of the ETA when a description of the object is displayed. That is, from the user's point of view, the user (124) enters a local environment (101) and sweeps the environment directionally, from left to right, for example, with ETA (118). Because ETA (118) uses a directional antenna, the RFID tag (194) in the hanging plant, the RFID tag (192) in the sofa, and the RFID (190) tag in the rocking chair are each activated in turn as the ETA is pointed at them, thereby causing retrieval and playback of an audio clip representing each object as the ETA is pointed approximately at each object, thereby providing also an indication of the approximate direction from the ETA to each object.

The use of a directional antenna provides also the opportunity to infer and display information representing relative distance to an object. An RFID reader in ETA (118) is capable of transmitting and receiving over a limited range. The size of the range may vary from a few inches to many feet, but it does have some limit, a limit quickly learned by a user. Perceiving a playback of a sound recording for an object, therefore always signals to the user that the object is with the maximum range of the RFID reader in the ETA. In addition, ETA (118) infers an approximate distance to the object in dependence upon a signal strength of an RFID signal from the RFID tag associated with the object. ETA (118) contains electronics that recover and measure the relative radio signal strength of reflected radio signals from RFID tags. The measurement of the relative radio signal strength is represented internally within the ETA (118) as an electronic digital or analog encoding of signal strength. Such an electronic representation of relative signal strength is then used as an input to an interface adapter such as one or more sound cards, audio amplifiers, or a multi-channel output adapter, to vary the loudness of the sound recording representing the object. The input to such an interface adapter may, for example, be represented by a voltage variable gain control or other electronic means for affecting loudness of playback of a sound recording.

Figure 2:
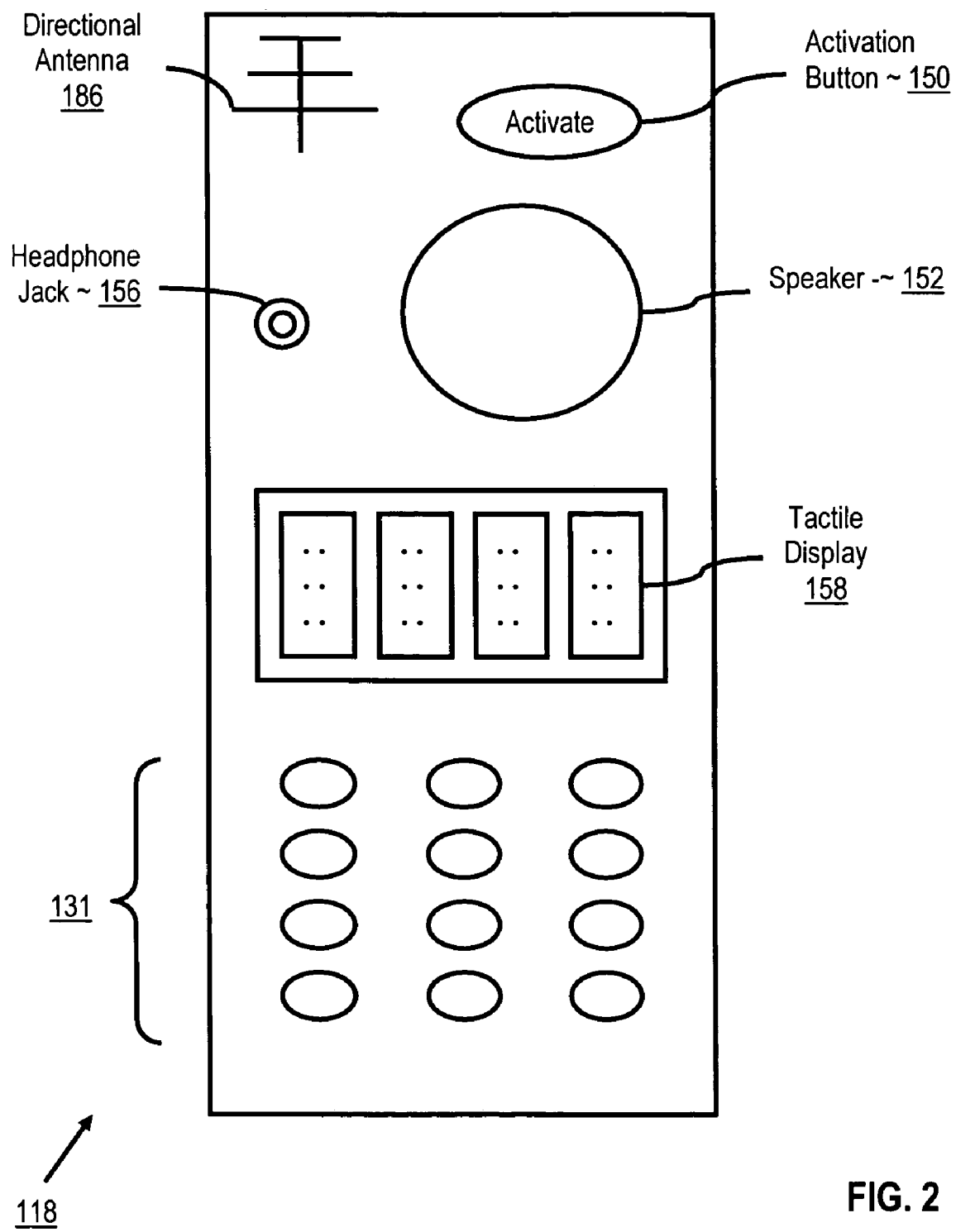
FIG. 2 sets forth a line drawing of an exemplary ETA (118) according to embodiments of the present invention.

FIG. 2 sets forth a line drawing of an exemplary ETA (118) according to embodiments of the present invention. Similar in form factor to a remote control for a television set or a VCR, ETA (118) includes an "Activate" button (150) to trigger its internal RFID reader. In many ETAs according to the present invention, Activate button (150) is configured to support a single press and release so as to trigger a single RFID activation or a series of single RFID operations—or to be held down or locked down for continuous RFID operation.

ETA (118) includes a directional antenna (186), which in FIG. 2 is shown in the line drawing of ETA (118), but which as a practical matter is typically mounted on a circuit board within ETA (118), mounted within or upon the case of ETA (118), or otherwise mounted as will occur to those of skill in the art. ETA (118) includes a headphone jack (156) and a speaker (152) to support playback of sound recordings representing objects or attributes of objects associated with RFID tags. ETA (118) includes an optional tactile display, which may be implemented as a refreshable Braille display or a refreshable non-Braille tactile display.

ETA (118) also includes a keypad (131) to support user entry of information or queries. ETA (118) may be programmed, for example, to support user entry of queries regarding objects in an environment. A user looking for a place to sit down in an airport lounge may enter "sitable," for example. Then when the activate button is pressed, the ETA will ignore responses from RFID tags on non-sitable objects and display for the user only retrieved information describing sitable objects in the local environment, stools at food stands, seats in waiting areas, and so on. Whether an object is 'sitable' or 'non-sitable' may be indicated in a classification code for the object stored in an RFID tag associated with the object and retrieved by the ETA when the ETA activates the RFID tag.

Figure 3:
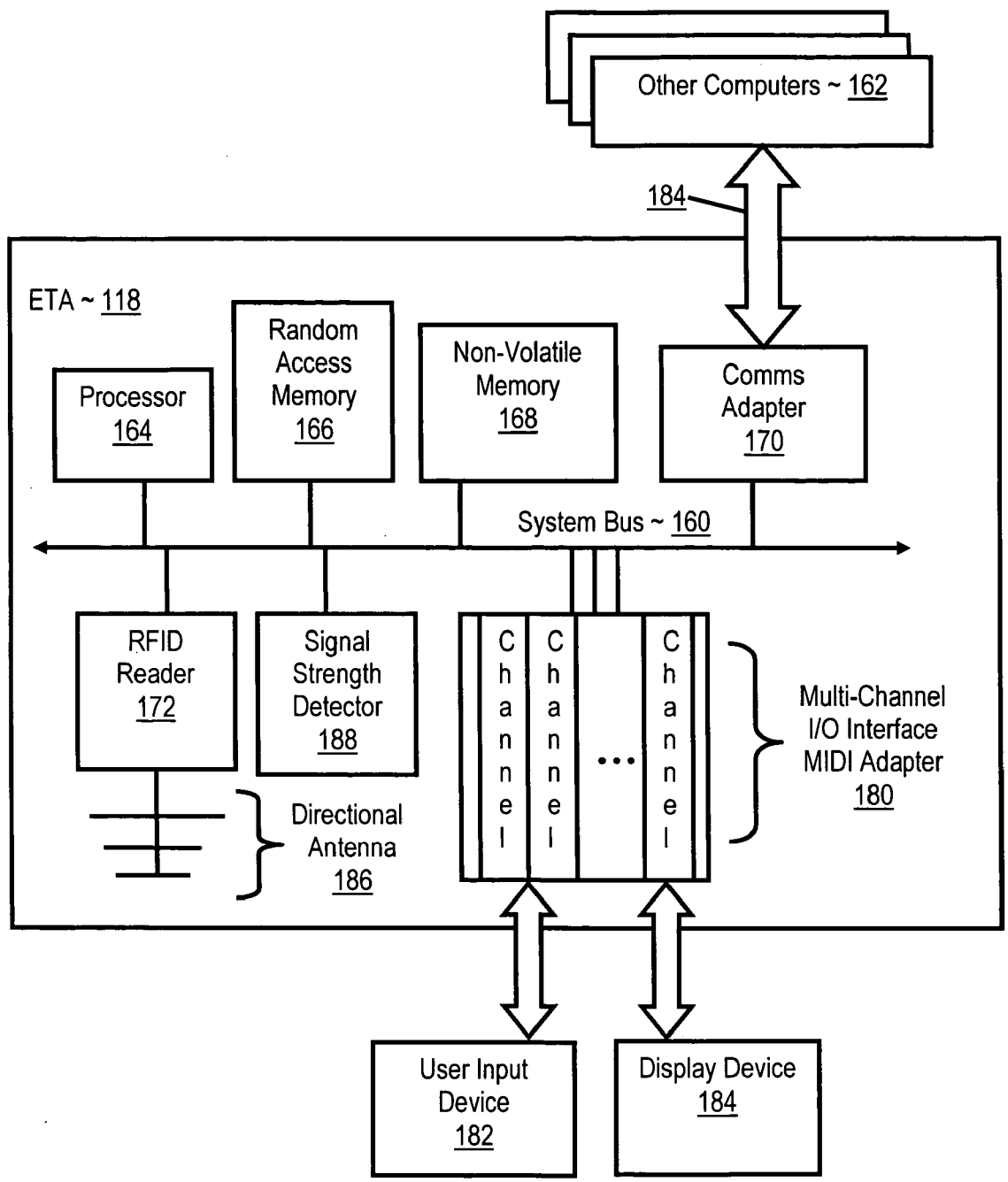
FIG. 3 is a block diagram of an exemplary ETA showing relations among components of included automated computing machinery.

ETAs according to embodiments of the present invention typically include, not only RFID readers, but also automated computing machinery designed and implemented to operate an RFID reader to activate RFID tags, process unique identification codes and other information retrieved from RFID tags through an RFID reader, retrieve recordings from storage, and play sound recordings through an audio interface. FIG. 3 is a block diagram of an exemplary ETA showing relations among components of automated computing machinery comprising the ETA. In the example of FIG. 3, ETA (118) includes a processor (164), also typically referred to as a central processing unit or 'CPU.' The processor may be a microprocessor, a programmable control unit, or any other form of processor useful according to the form factor of a particular ETA as will occur to those of skill in the art. Other components of ETA (118) are coupled for data transfer to processor (164) through system bus (160).

ETA (118) includes random access memory or 'RAM' (166). Application program implementing inventive methods of the present invention are typically stored in RAM (166). In addition, application programs, identification codes for RFID tags, classification codes for the objects associated with RFID tags, and type codes for sound recordings (skin identifiers), and other useful information may be stored in RAM (166) or in non-volatile memory (168). Non-volatile memory (168) may be implemented as a magnetic disk drive such as a micro-drive, an optical disk drive, static read only memory ('ROM'), electrically erasable programmable read-only memory space ('EEPROM' or 'flash' memory), or otherwise as will occur to those of skill in the art.

ETA (118) includes communications adapter (170) implementing data communications connections (184) to other computers (162), which may be servers, routers, or networks. Communications adapters implement the hardware level of data communications connections through which ETAs, servers, and routers send data communications directly to one another and through networks. Examples of communications adapters include modems for wired dial-up connections, Ethernet (IEEE 802.3) adapters for wired LAN connections, 802.11b adapters for wireless LAN connections, and Bluetooth adapters for wireless microLAN connections.

ETA (118) includes an RFID reader (172) coupled to directional antenna (186). Signal strength detector (188) provides a signal whose magnitude represents the signal strength of a reflected radio signal received from an RFID tag through RFID reader (172). The signal from signal strength detector (188) typically is used to drive automated gain controls in I/O interface adapter (180) to vary the loudness of playback of sound recordings representing attributes of objects.

The example ETA (118) of FIG. 3 includes at least one input/output interface adapter (180). Input/output interface adapters implement user-oriented input/output through, for example, software drivers and computer hardware for controlling output to display devices (184) such as audio displays and tactile displays, as well as user input from user input devices (182) such as 'Activate' buttons and keypads. Input/output adapter (180) preferably includes more than one audio channel, so that more then one audio clip may be played through it at the same time. Input/output adapter (180) in FIG. 3 is shown with three such channels, but three is not a limitation of the present invention; output adapters according to embodiments of the present invention may utilize any number of audio channels. Moreover, although some embodiments, such as those for WAV or MP3 clips, may implement physical channels of audio processing and amplification, other embodiments, such as those using MIDI sequences, implement logical audio channels encoded in a single data stream. As explained above, in many embodiments of ETAs according to the present invention, the control functionality of a sequencer and the sound generation functionality of a multitimbral synthesizer are preferably combined into a single multi-channel output interface adapter (180), and such an adapter is referred to in this specification as a 'MIDI adapter.'

As shown in FIG. 1, travel environments often include a multiplicity of objects having RFID tags. As a user scans such an environment with an ETA, several RFID signals from several tags will often be received and processed at approximately the same time, that is. It will be a slow experience for the user, however, to wait for all the audio clips to play back serially and separately. It is preferable therefore to play back all audio clips simultaneously and synchronously through more than one audio channel. Such playback may not be literally simultaneous because from the point of view of computer speeds, the playback of each clip may proceed a second or a fraction of second after another clip. From the point of view of the user, however, it would appear that all audio clips for all the objects having RFID tags in the environment play, overlaying one another, at about the same time and so coordinated as to present a coherent whole, as in the case of a song or musical piece with various parts recorded and played back through separate channels but still having correct overall temporal relations with one another.

It is preferable that sound recordings representing objects are recordings of sounds other than vocal descriptions of objects. It is difficult to understand several words heard simultaneously. They interfere with one another and confuse perception. It is possible within the scope of the present invention that a sound recording representing an object is simply an oral description of the object. A sound recording representing a chair may be a recording of a voice speaking the word "chair." In a room like the one shown in FIG. 1, where there is a chair, a sofa, and a hanging plant. As a user scans such a room with an ETA, the user may be presented with overlapping playback of the words "chair," "sofa," and "hanging plant," thereby presenting a jumbled audio impression that is difficult to understand. Other kinds of sounds are preferably heard simultaneously, several notes in a musical scale forming a chord, for example, a song or musical composition, or even the simultaneous, synchronous presentation of a chirping cricket, a burbling brook, and leaves rustling in a breeze.

Figure 4:
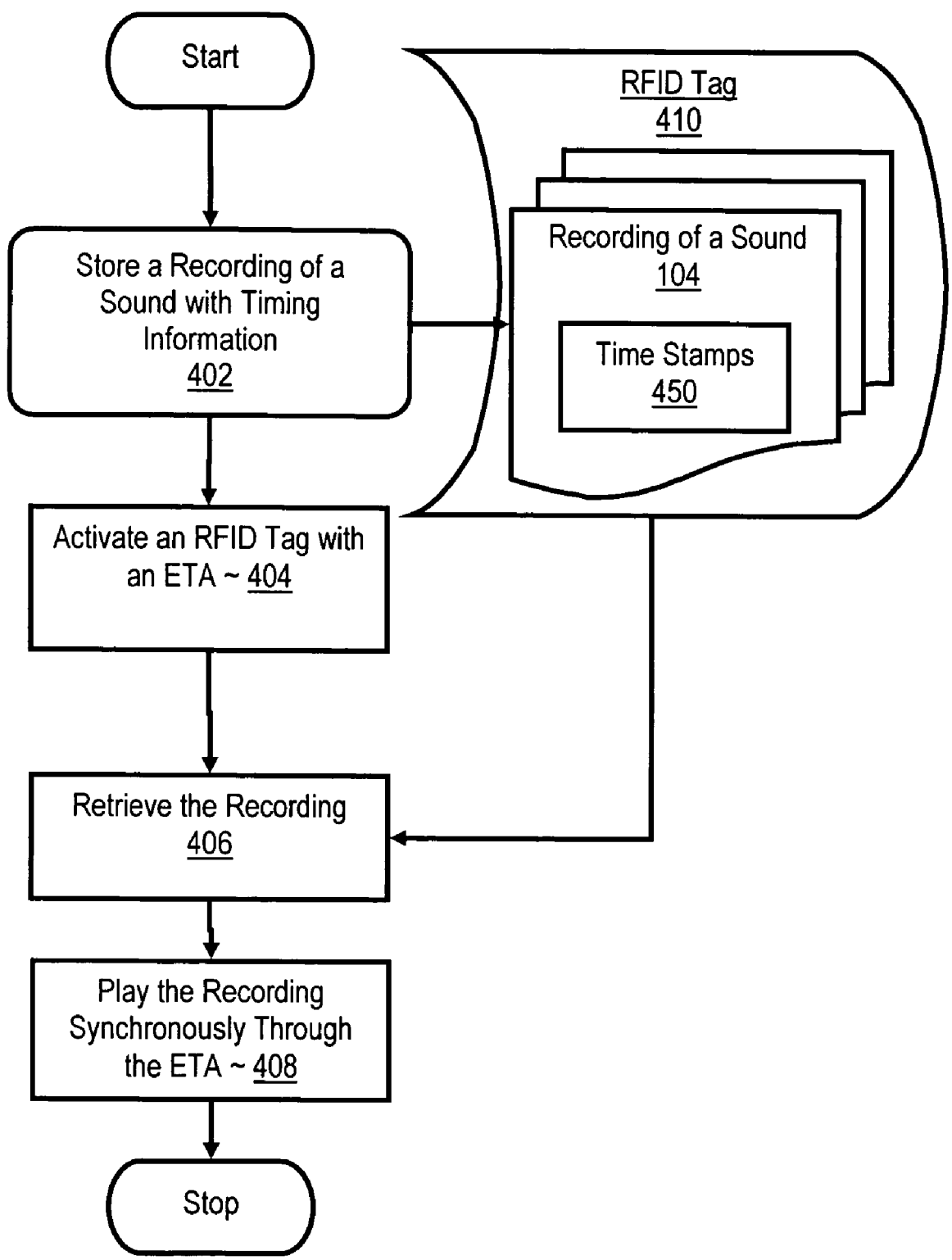
FIG. 4 sets forth a flow chart illustrating a method for radio frequency identification aiding the visually impaired.

By way of further explanation, FIG. 4 sets forth a flow chart illustrating an exemplary method for radio frequency identification aiding the visually impaired that includes storing (402) a recording of a sound (104), including timing information (450) for synchronous playback, representing at least one attribute of an object having associated with it a radio frequency identification ("RFID") tag (410). A recording of a sound is referred to as a 'sound recording' or an 'audio clip.' In the method of FIG. 4, storing a recording of a sound may be carried out by storing the recording as a MIDI channel number and a MIDI sequence. The MIDI channel number is needed because more than one sound recording may be stored in a MIDI sequence, one for each available MIDI channel. Alternatively, the MIDI channel numbers may be assigned under CPU control from a pool of channel numbers.

A sound recording may represent one or more attributes of an object. In a trivial case, the existence of a sound recording representing a single attribute of an object typically represents merely the attribute of the object's presence in a travel environment of a visually impaired ETA user. That is, in the trivial case, the mere existence of a representative recording means that the represented object is present.

In more complex examples, variations in sounds recorded may represent any attribute of any object, color, size, shape, location, and so on. An object located in the north end of a hallway may be represented by a single, steady musical note played on a violin. The same object located in the south end of the same hallway may be represented by the same note on the same instrument played with a trill. The usefulness of a particular sound skin to a particular user requires some training, but the potential quantity of information available for presentation regarding the user's travel environment is large.

The method of FIG. 4 also includes activating (404) the RFID tag with an electronic travel aid ("ETA") for the visually impaired, retrieving (406) the recording from storage, and playing (408) the recording synchronously through an audio interface of the ETA. The purpose of activating the RFID tag is to retrieve from it some data describing the object with which it is associated. In many instances, retrieving data describing an object means retrieving a unique identification code for the tag such as a serial number and using that code, and perhaps other data, to locate and retrieve a sound recording from a data store.

Figure 4A:
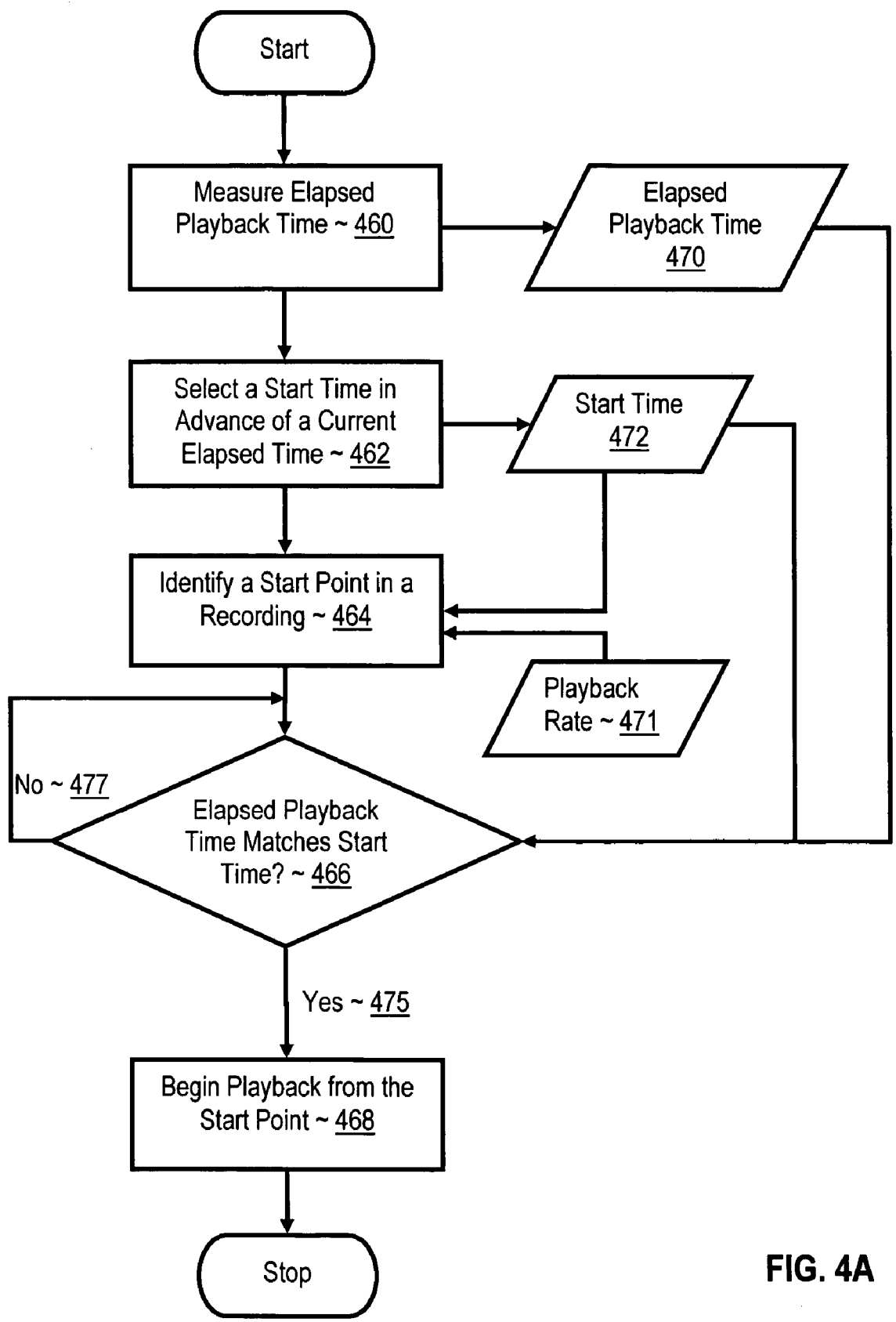

FIG. 4A illustrates a method of playing a recording synchronously through an ETA according to embodiments of the present invention. The method of FIG. 4A is explained also with reference to FIG. 4B, a line drawing depicting timing relationships for the method of FIG. 4A. In the example of FIG. 4a, the timing information for synchronous playback is taken as a playback rate (471) for a digital recording format such as WAV, MP3, or any other digital format for sound recordings as will occur to those of skill in the art.

Playback rates may be expressed in terms of some quantity of digital data per second, such as, for example, bits/second or bytes/second. The playback rate is generally equivalent to the sampling rate for recording a digital sound recording from an analog source. Consider the example of WAV files. As the digital audio format used in Microsoft WindowS™, WAV files allow different sound qualities to be recorded. When converting an analogue signal to a digital wav file, the sampling frequency with which samples are taken and converted into digital form advantageously is at least twice that of the highest analogue frequency being captured. Samples can be taken at rates from 8,000 Hz to 48000 Hz. The quality of the recording varies with the sampling rate and the sample size.

Not all recordings require the same quality. A sampling rate for CD quality playback, for example, is 44.1 KHz, slightly more than double the 20 KHz frequency a person can hear. The sampling rate for digitizing voice for a telephone-quality conversation is 8 KHz, twice the 4 KHz required for the full spectrum of the human voice. Sample size also affects quality. Samples can be taken as 8-bit bytes, 16-bit words, 24-bit double-words, or even in larger sizes. CD quality is not only a sample rate of 44,100 Hz but also a sample size of 16 bits. Some professional recording studios use 24-bit samples or even larger sample sizes at sampling rates as high as 48,000 Hz.

Figure 4B:
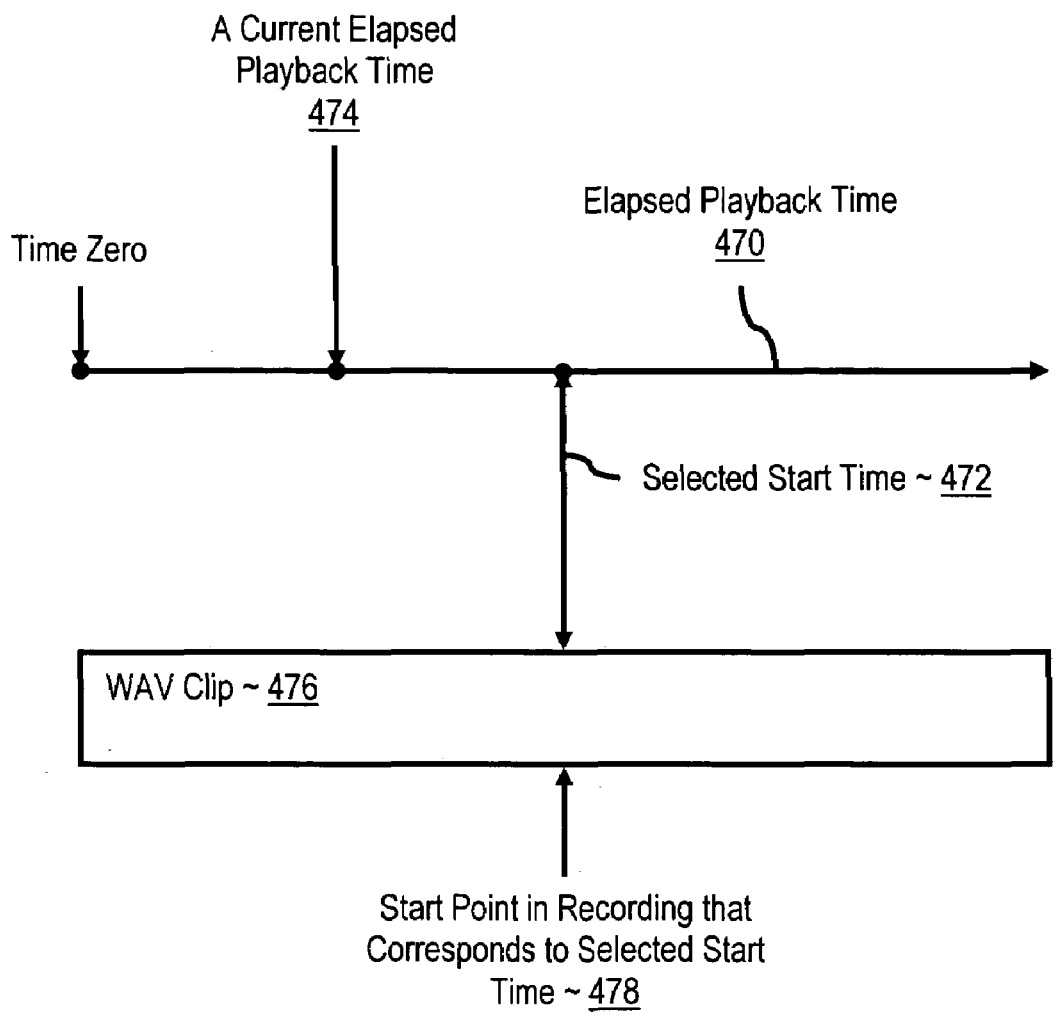

The method of FIG. 4A includes measuring (460) elapsed playback time (470) and selecting (462) a start time (472) in advance of a current elapsed playback time (474 on FIG. 4B). The elapsed playback time typically is measured with a computer system clock on the ETA. The elapsed playback time is measured from a time (labeled 'time zero' on FIG. 4B) that represents the beginning of overall playback of one or more synchronized sound recordings as, for example, would be typed together within a skin. A current elapsed playback time (474) represents or approximates a time when an RFID is activated by an ETA. The ETA needs at least some small amount of time to retrieve the recording from storage before beginning playback, so that it is useful to select a start time (472) in advance of the current elapsed playback time (474).

The method of FIG. 4A also includes identifying (464), in dependence upon the selected start time (472) and the playback rate (471), a start point (478 on FIG. 4B) in the recording (476 on FIG. 4B) that corresponds to the selected start time (472), and, when the elapsed playback time matches the selected start time (475), beginning (468) playback of the recording from the start point. The method of FIG. 4A includes comparing (466) elapsed playback time (470) and the selected start time (472), looping (477) on the comparison until elapsed playback time 'matches' the selected start time.

The term 'match' is used as a reminder that the elapsed playback time typically will not be measured to exactly equal the selected start time. In fact, 'matching' will generally be implemented as 'equal to or greater than,' in the sense that the comparison (466) will be considered to succeed when the elapsed playback time is equal to or later than the selected start time. This is true because measurements by computer clock are typically conducted at intervals that are very, very short compared to sound recording playback rates. Detecting that elapsed playback time is equal to or later than the selected start time, measured in the microseconds or nanoseconds of CPU clock time intervals, gives an ETA plenty of time to begin synchronous playback from the start point (478).

The method of FIG. 4A includes beginning (468) playback of the recording from the start point when the elapsed playback time matches the selected start time (475). The start point may be calculated by subtracting time zero from the selected start time and multiplying the playback rate by the difference. That is, the start point may be calculated by multiplying the playback rate by the selected start time expressed as the time elapsed since time zero. For a selected start time 10 seconds after time zero for a sound recording in the form of a CD quality WAV clip, the start point in the WAV clip for synchronous playback with another WAV clip whose playback started at time zero, for example, would be 10 seconds multiplied by the 44,100 words/second. This exemplary start point is located at the 441,000$^{th}$ 16-bit data word in the WAV clip.

Further according to the example of FIG. 4, the recording may be implemented as a MIDI sequence stored with a channel number for the recording, and retrieving the recording from storage may be carried out by retrieving the MIDI sequence and the MIDI channel number. Alternatively, the channel number may be assigned from a pool of channel numbers. Also according to the method of FIG. 4, playing the recording synchronously may be carried out by instructing a MIDI sequencer to turn on a MIDI channel identified by the MIDI channel number and sending the MIDI sequence through the sequencer to a multitimbral MIDI synthesizer in the ETA. In the exemplary ETA of FIG. 3, such an instruction is implemented in an application program in RAM (166) and communicated to a MIDI sequencer of MIDI adapter (180) from processor (164) through system bus (160).

In a trivial case, shown on FIG. 4, storing (402) a recording (104) is carried out by storing a recording on the RFID tag (410) itself, so that retrieving (406) the recording is carried out by receiving the recording in the ETA from the RFID tag when the RFID tag is activated. That is, in the simple case, retrieving descriptive data means directly receiving right in the ETA, directly from an RFID tag associated with an object, a sound recording representing the object or attributes of the object.

In such a case, there is no need for the ETA to know a unique identification code or serial number for the RFID tag, although the information retrieved from the tag may sometimes usefully include a type code for the recording, that is, a skin identifier. Consider an example in which a skin is identified for use in an ETA through the use of a recording type code or 'skin identifier' installed in the ETA as a setup parameter. Such a setup parameter may, for example, be entered through keypad such as the one illustrated at reference (131) on FIG. 2 and stored in non-volatile computer memory in the ETA, memory such as that illustrated at reference (168) on FIG. 3. Such a recording type code or skin identifier represents the user's preferred skin, the user's preferred grouping of sound recordings representing objects that the user encounters in travel.

In the current example, in order to support the user's choice of skin, an RFID tag may have recorded upon it a multiplicity of sound recordings, each of which is identified with a separate recording type code or skin identifier. In this example, when a user activates such an RFID tag, the activating ETA is programmed to retrieve and playback for the user only one of the several sound recordings installed on the RFID tag, the one identified with the same skin identifier installed in the setup parameters of the ETA. In this way, although the methodology does require rather more memory capacity on the RFID tags, embodiments of the present invention nevertheless may support multiple skins with no need for remote storage or on-line services for remote retrieval of sound recordings.

Figure 5:
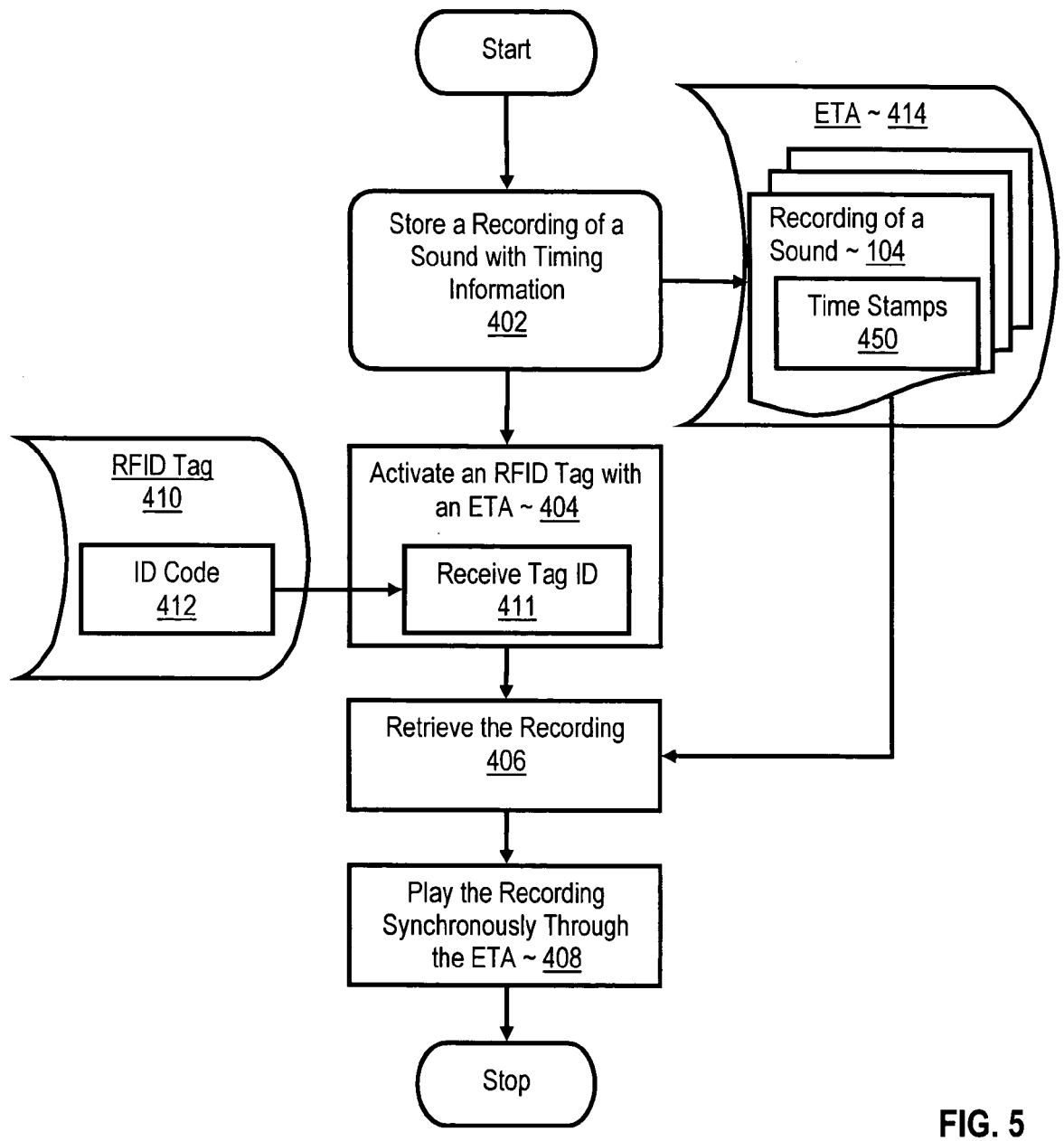
FIG. 5 sets forth a flow chart illustrating a further exemplary method for radio frequency identification aiding the visually impaired.

FIG. 5 sets forth a flow chart illustrating a further exemplary method for radio frequency identification aiding the visually impaired where storing (402) a recording (104) is carried out by storing the recording, including timing information (450) for synchronous playback, on an ETA (414). In the method of FIG. 5, storing a recording of a sound may be carried out by storing the recording as a MIDI channel number and a MIDI sequence. The MIDI channel number is needed because more than one sound recording may be stored in a MIDI sequence, one for each available MIDI channel.

In the method of FIG. 5, rather than receiving an audio clip from the tag, activating (404) the RFID tag includes receiving (411) in the ETA from the RFID tag (410) an identification code (412) for the tag. In the method of FIG. 5, therefore, retrieving (406) the recording is carried out by retrieving the recording (104) from storage. In the example of FIG. 5, retrieval from storage is retrieval from storage in the ETA (414) in dependence upon the identification code for the tag. Retrieval is carried out on dependence upon the identification code for the tag because a multiplicity of audio clips may be stored in the ETA, indexed or sorted according to RFID tag identification codes.

In the method of FIG. 5, the recording may be a MIDI sequence stored with a channel number for the recording, and retrieving the recording from storage may be carried out by retrieving the MIDI sequence and the MIDI channel number, both sorted or indexed according to the tag identification code or serial number. Also according to the method of FIG. 4, playing the recording synchronously may be carried out by instructing a MIDI sequencer to turn on a MIDI channel identified by the MIDI channel number and sending the MIDI sequence through the sequencer to a multitimbral MIDI synthesizer in the ETA. As mentioned above, in terms of the exemplary ETA of FIG. 3, such an instruction is implemented in an application program in RAM (166) and communicated to a MIDI sequencer of MIDI adapter (180) from processor (164) through system bus (160).

Memory capacity in an ETA will always be limited, always smaller than the memory capacity available through the use of remote storage. Nevertheless, such embodiments are useful in circumstances in which a developer or manufacturer can identify a limited range of objects to be described. An example of such a circumstance is any public place frequented by the visually impaired, particularly places where wireless hot spots may not be available, places like airports, bus stations, train stations, theatres, libraries, and so on, as will occur those of skill in the art. In many such environments, managers or owners advantageously may make ETAs according to the present invention available to the visually impaired for use during visits to such venues.

Figure 6:
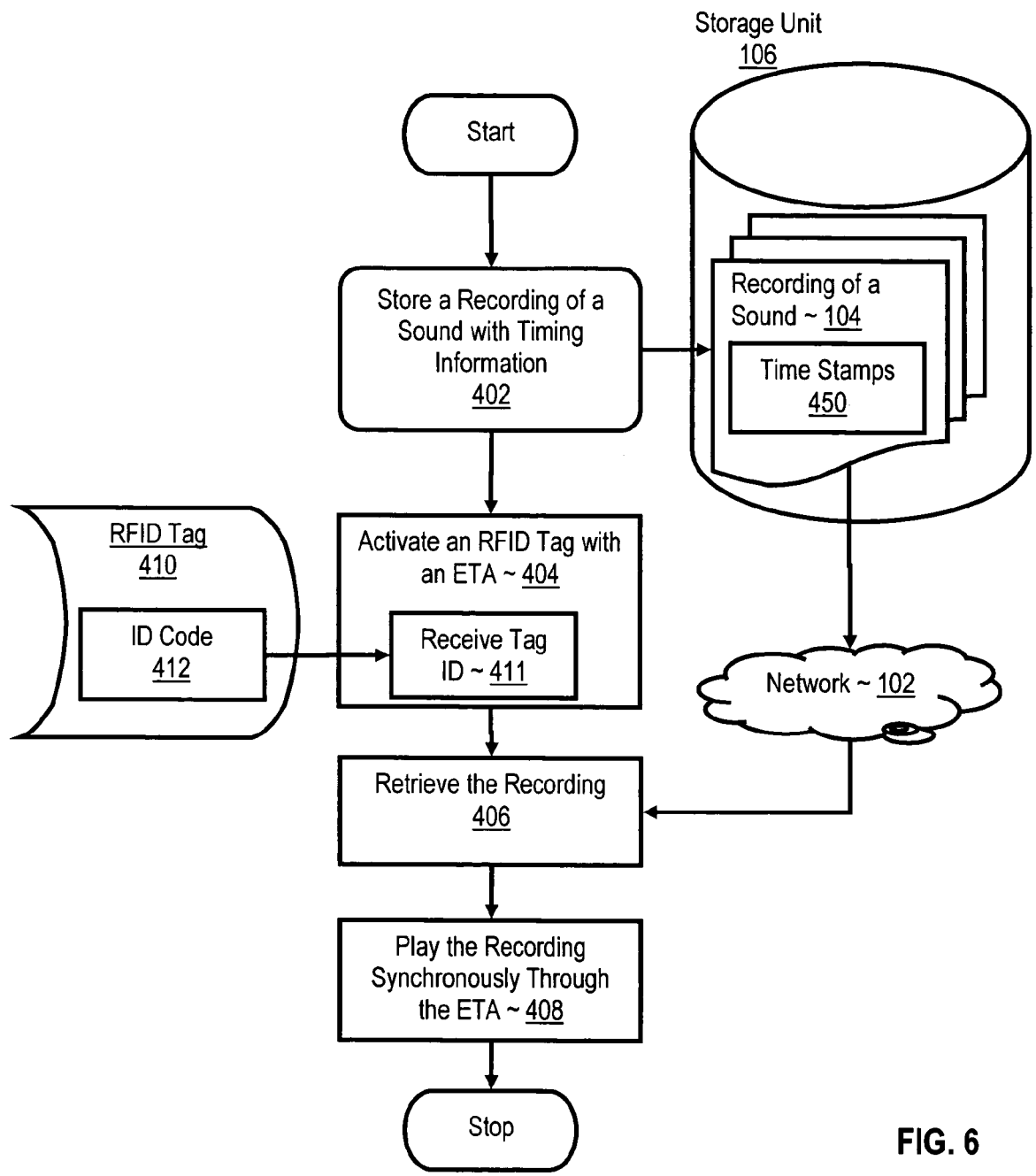
FIG. 6 sets forth a flow chart illustrating a still further exemplary method for radio frequency identification aiding the visually impaired.

FIG. 6 sets forth a flow chart illustrating a still further exemplary method for radio frequency identification aiding the visually impaired where storing (402) a recording (104) is carried out by storing the recording, including timing information (450) for synchronous playback, in a remote location (106), that is, a location remote from the ETA or remote from the local environment in which the ETA is presently deployed. In the method of FIG. 6, storing a recording of a sound may be carried out by storing the recording as a MIDI channel number and a MIDI sequence. The MIDI channel number is needed because, as noted above, more than one sound recording may be stored in a MIDI sequence, one for each available MIDI channel.

In the method of FIG. 6, activating (404) the RFID tag includes receiving (411) in the ETA from the RFID tag an identification code (412) for the tag. In the method of FIG. 6, retrieving (406) the recording includes retrieving the recording from the remote location in dependence upon the identification code for the tag. In the example of FIG. 6, the retrieval is accomplished remotely across network (102). Readers will appreciate that the method of FIG. 6 is a more general case. The identification code (412) for the RFID tag may be associated with any object, and its representative sound recording may be located anywhere in the world, anywhere in cyberspace.

In the method of FIG. 6, the recording may be a MIDI sequence stored with a channel number for the recording, and retrieving the recording from storage is preferably carried out by retrieving the MIDI sequence and the MIDI channel number, both sorted or indexed according to the tag identification code or serial number. Also in the method of FIG. 4, playing the recording synchronously may be carried out by instructing a MIDI sequencer to turn on a MIDI channel identified by the MIDI channel number and sending the MIDI sequence through the sequencer to a multitimbral MIDI synthesizer in the ETA. As mentioned above, in terms of the exemplary ETA of FIG. 3, such an instruction is implemented in an application program in RAM (166) and communicated to a MIDI sequencer of MIDI adapter (180) from processor (164) through system bus (160).

Figure 7:
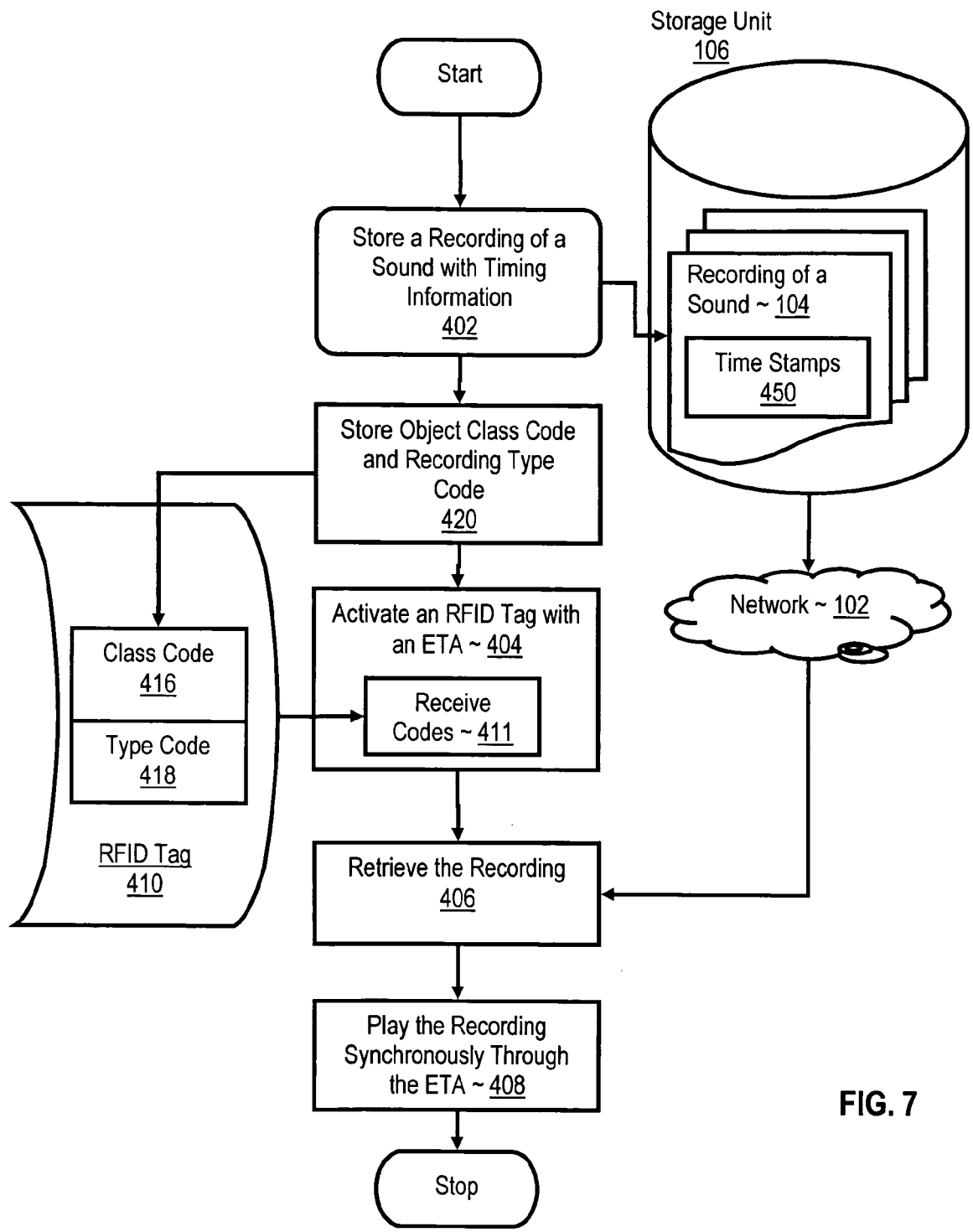
FIG. 7 sets forth a flow chart illustrating a still further exemplary method for radio frequency identification aiding the visually impaired.

FIG. 7 sets forth a flow chart illustrating a still further exemplary method for radio frequency identification aiding the visually impaired where storing (402) a recording (104) is carried out by storing the recording, including timing information (450) for synchronous playback, in a remote location. In the method of FIG. 7, storing a recording of a sound may be carried out by storing the recording as a MIDI channel number and a MIDI sequence. The MIDI channel number is needed because, as noted above, more than one sound recording may be stored in a MIDI sequence, one for each available MIDI channel.

The method of FIG. 7 includes storing (420) on the RFID tag (410) a classification code (416) for the object and a type code (418) for the recording. In the method of FIG. 7, activating (404) the RFID tag includes receiving from the RFID tag in the ETA the classification code (416) for the object and the type code (418) for the recording. In the method of FIG. 7, retrieving (406) the recording (104) from storage is carried out by retrieving the recording from the remote location in dependence upon the classification code for the object and the type code for the recording.

Figure 8:
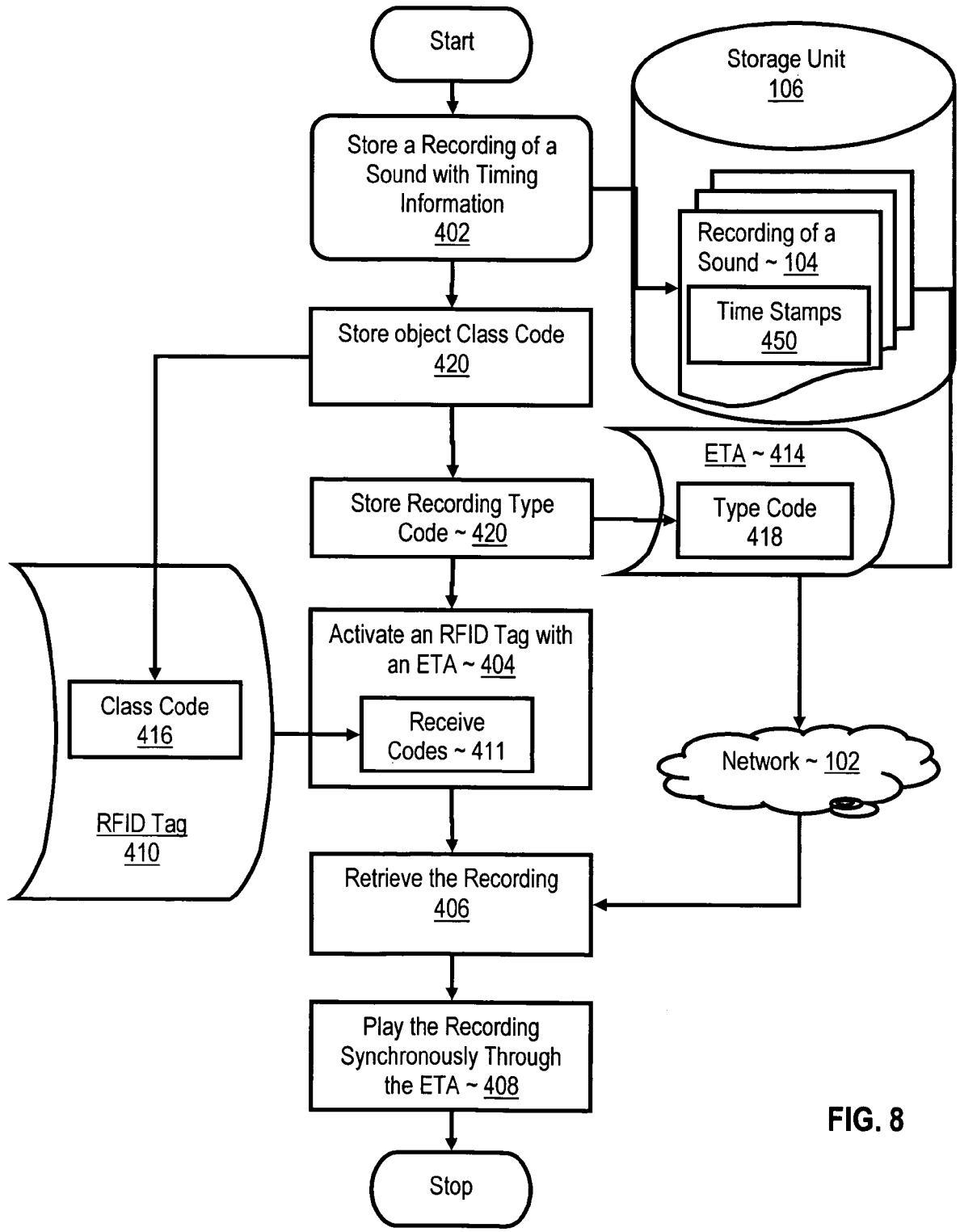
FIG. 8 sets forth a flow chart illustrating a still further exemplary method for radio frequency identification aiding the visually impaired.

Table 1 illustrates an exemplary data structure useful in storing and retrieving audio clips with methods of the kind shown in FIGS. 7 and 8.

TABLE 1

| Object Classification Code | Recording Type Code (Skin Identifier) | BLOB | File System Location | MIDI Channel |
|---|---|---|---|---|
| — | — | — | — | — |
| — | — | — | — | — |
| — | — | — | — | — |

For the example of MIDI, the object classification code and the recording type code (skin identifier) of Table 1, taken together, uniquely key a MIDI sequence. To the extent that storage of the MIDI sequence is administered through a database management system that supports BLOBs (Binary Large OBjects), each MIDI sequence may be stored in a BLOB field in a record of a table similar to Table 1. For storage under database management systems that do not support BLOBs, such a data structure may provide a 'File System Location' field that identifies where on a file system available to the database manager a MIDI sequence is stored.

Because each MIDI sequence may contain more than one sound recording on more than one MIDI channel, in order to uniquely key a particular sound recording, Table 1 provides a 'MIDI Channel' field. In the structure of Table 1, therefore, the object classification code, the recording type code, and the MIDI channel number taken together uniquely key not only a particular MIDI sequence, but also uniquely key a particular sound recording on a particular channel of the MIDI sequence.

In the method of FIG. 7, where the recording may be a MIDI sequence stored with a channel number for the recording, retrieving the recording from storage may be carried out by retrieving the MIDI sequence and the MIDI channel number, both sorted or indexed according to the object classification code and the recording type code (skin identifier). Also in the method of FIG. 4, playing the recording synchronoulsy may be carried out by instructing a MIDI sequencer to turn on a MIDI channel identified by the MIDI channel number and sending the MIDI sequence through the sequencer to a multitimbral MIDI synthesizer in the ETA. As mentioned above, in terms of the exemplary ETA of FIG. 3, such an instruction is implemented in an application program in RAM (166) and communicated to a MIDI sequencer of MIDI adapter (180) from processor (164) through system bus (160).

The method of FIG. 7, in which both the object classification code and the recording type code (skin identifier) are stored on the RFID tag, may provide users little opportunity or flexibility to alter the skin. It may be easy for tag manufacturers or object manufacturers to alter the skin identifier in the RFID tag during manufacturing operations, but ordinary users may not have the equipment to make such alterations in RFID tags. FIG. 8 illustrates a method in which users are provided more flexibility regarding skin selection.

FIG. 8 sets forth a flow chart illustrating a still further exemplary method for radio frequency identification aiding the visually impaired where storing (402) a recording (104) is carried out by storing a recording, including timing information (450) for synchronous playback, in a remote location. In the method of FIG. 8, storing a recording of a sound may be carried out by storing the recording as a MIDI channel number and a MIDI sequence. As noted above, the MIDI channel number is needed because more than one sound recording may be stored in a MIDI sequence, one for each available MIDI channel.

The method of FIG. 8 also includes storing (420) on the RFID tag (410) a classification code (416) for the object. The method of FIG. 8 also includes storing (420) in the ETA a type code (418) for the recording. In the method of FIG. 8, activating (404) the RFID tag includes receiving (411) from the RFID tag in the ETA the classification code (416) for the object. In the method of FIG. 8, retrieving (406) the recording (104) from storage is accomplished by retrieving the recording from the remote location in dependence upon the classification code for the object and the type code for the recording.

In the method of FIG. 8, where the recording may be a MIDI sequence stored with a channel number for the recording, retrieving the recording from storage may be carried out by retrieving the MIDI sequence and the MIDI channel number, both sorted or indexed according to the object classification code and the recording type code (skin identifier). Also in the method of FIG. 4, playing the recording synchronously may be carried out by instructing a MIDI sequencer to turn on a MIDI channel identified by the MIDI channel number and sending the MIDI sequence through the sequencer to a multitimbral MIDI synthesizer in the ETA. As mentioned above, in terms of the exemplary ETA of FIG. 3, such an instruction is implemented in an application program in RAM (166) and communicated to a MIDI sequencer of MIDI adapter (180) from processor (164) through system bus (160).

In the method of FIG. 8, where the recording type code is stored on the ETA, the recording type code is stored in non-volatile memory (168 on FIG. 3) as a setup parameter of the ETA. In this method, the recording type code may be altered at any time by the user by, for example, typing in a new recording type code (skin identifier) by use of keypad such as the one shown at reference (131) on FIG. 2. In this method, a user can vary at will the sound groupings representing object encountered in travel with an ETA.

Readers can now appreciate that the use by visually impaired persons of ETAs according to embodiments of the present invention has substantial advantages. ETAs according to the present invention can offer a user a large amount of information regarding the user's general orientation to a travel environment. In addition, the information provided can be voluminous, precise, and audibly pleasing. Moreover, ETAs according to the present invention have the capability of describing generally and pleasingly hazards and other objects that would not be detected at all by long canes and would never be known to the user of a guide dog.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for radio frequency identification aiding the visually impaired, the method comprising:
storing a recording of a sound representing at least one attribute of an object having associated with the object a radio frequency identification ("RFID") tag, wherein the recording includes timing information for synchronous playback;
wherein the timing information comprises a playback rate;
activating the RFID tag with an electronic travel aid ("ETA") for the visually impaired including receiving information from the RFID tag;
retrieving the recording from storage; and
playing the recording synchronously through an audio interface of the ETA including:
measuring elapsed playback time;
selecting a start time in advance of a current elapsed playback time;
identifying, in dependence upon the selected start time and the playback rate, a start point in the recording that corresponds to the selected start time; and
when the elapsed playback time matches the selected start time, beginning playback of the recording from the start point.

2. The method of claim 1 further comprising playing a plurality of recordings synchronously through the audio interface of the ETA.

3. The method of claim 1 wherein:
storing a recording of a sound comprises storing the recording as a MIDI sequence;
retrieving the recording from storage comprises retrieving the MIDI sequence; and
playing the recording synchronously comprises instructing a MIDI sequencer to turn on a MIDI channel and sending the MIDI sequence through the sequencer to a multitimbral MIDI synthesizer.

4. The method of claim 1 wherein:
storing a recording of a sound comprises storing the recording as a MIDI sequence;
the method further comprises storing on the RFID tag a classification code for the object and a type code for the recording;
activating the RFID tag comprises receiving from the RFID tag in the ETA the classification code for the object and the type code for the recording;
retrieving the recording from storage comprises retrieving the MIDI sequence in dependence upon the classification code for the object and the type code for the recording; and
playing the recording synchronously comprises instructing a MIDI sequencer to turn on a MIDI channel and sending the MIDI sequence through the sequencer to a multitimbral MIDI synthesizer.

5. The method of claim 1 wherein:
storing a recording of a sound comprises storing the recording as a MIDI sequence;
the method further comprises storing on the RFID tag a classification code for the object;
the method further comprises storing in the ETA a type code for the recording;
activating the RFID tag comprises receiving from the RFID tag in the ETA the classification code for the object;
retrieving the recording from storage comprises retrieving the MIDI sequence in dependence upon the classification code for the object and the type code for the recording; and
playing the recording synchronously comprises instructing a MIDI sequencer to turn on a MIDI channel and sending the MIDI sequence through the sequencer to a multitimbral MIDI synthesizer.

6. A system for radio frequency identification aiding the visually impaired, the system comprising:
means for storing a recording of a sound representing at least one attribute of an object having associated with the object a radio frequency identification ("RFID") tag, wherein the recording includes timing information for synchronous playback;
wherein the timing information comprises a playback rate;
means for activating the RFID tag with an electronic travel aid ("ETA") for the visually impaired including means for receiving information from the RFID tag;
means for retrieving the recording from storage; and
means for playing the recording synchronously through an audio interface of the ETA including:
means for measuring elapsed playback time;
means for selecting a start time in advance of a current elapsed playback time;
means for identifying, in dependence upon the selected start time and the playback rate, a start point in the recording that corresponds to the selected start time; and
means for beginning playback of the recording from the start point when the elapsed playback time matches the selected start time.

7. The system of claim 6 further comprising means for playing a plurality of recordings synchronously through the audio interface of the ETA.

8. The system of claim 6 wherein:
means for storing a recording of a sound comprises means for storing the recording as a MIDI sequence;
means for retrieving the recording from storage comprises means for retrieving the MIDI sequence; and
means for playing the recording synchronously comprises means for instructing a MIDI sequencer to turn on a MIDI channel and means for sending the MIDI sequence through the sequencer to a multitimbral MIDI synthesizer.

9. The system of claim 6 wherein:
means for storing a recording of a sound comprises means for storing the recording as a MIDI sequence;
the system further comprises means for storing on the RFID tag a classification code for the object and a type code for the recording;
means for activating the RFID tag comprises means for receiving from the RFID tag in the ETA the classification code for the object and the type code for the recording;
means for retrieving the recording from storage comprises means for retrieving the MIDI sequence in dependence upon the classification code for the object and the type code for the recording; and
means for playing the recording synchronously comprises means for instructing a MIDI sequencer to turn on a MIDI channel and means for sending the MIDI sequence through the sequencer to a multitimbral MIDI synthesizer.

10. The system of claim 6 wherein:
means for storing a recording of a sound comprises means for storing the recording as a MIDI sequence;
the system further comprises means for storing on the RFID tag a classification code for the object;
the system further comprises means for storing in the ETA a type code for the recording;
means for activating the RFID tag comprises means for receiving from the RFID tag in the ETA the classification code for the object;
means for retrieving the recording from storage comprises means for retrieving the MIDI sequence in dependence upon the classification code for the object and the type code for the recording; and
means for playing the recording synchronously comprises means for instructing a MIDI sequencer to turn on a MIDI channel and means for sending the MIDI sequence through the sequencer to a multitimbral MIDI synthesizer.

11. A computer program product for radio frequency identification aiding the visually impaired, the computer program product comprising:
a recording medium;
means, recorded on the recording medium, for storing a recording of a sound representing at least one attribute of an object having associated with the object a radio frequency identification ("RFID") tag, wherein the recording includes timing information for synchronous playback;
wherein the timing information comprises a playback rate;
means, recorded on the recording medium, for activating the REID tag with an electronic travel aid ("ETA") for the visually impaired including means, recorded on the recording medium, for receiving information from the RFID tag;
means, recorded on the recording medium, for retrieving the recording from storage; and
means, recorded on the recording medium, for playing the recording synchronously through an audio interface of the ETA including:
means, recorded on the recording medium, for measuring elapsed playback time;
means, recorded on the recording medium, for selecting a start time in advance of a current elapsed playback time;
means, recorded on the recording medium, for identifying, in dependence upon the selected start time and the playback rate, a start point in the recording that corresponds to the selected start time; and
means, recorded on the recording medium, for beginning playback of the recording from the start point when the elapsed playback time matches the selected start time.

12. The computer program product of claim 6 further comprising means, recorded on the recording medium, for playing a plurality of recordings synchronously through the audio interface of the ETA.

13. The computer program product of claim 11 wherein:
means for storing a recording of a sound comprises means, recorded on the recording medium, for storing the recording as a MIDI sequence;
means for retrieving the recording from storage comprises means, recorded on the recording medium, for retrieving the MIDI sequence; and
means for playing the recording synchronously comprises means, recorded on the recording medium, for instructing a MIDI sequencer to turn on a MIDI channel and means, recorded on the recording medium, for sending the MIDI sequence through the sequencer to a multitimbral MIDI synthesizer.

14. The computer program product of claim 11 wherein:
means for storing a recording of a sound comprises means, recorded on the recording medium, for storing the recording as a MIDI sequence;
the computer program product further comprises means, recorded on the recording medium, for storing on the RFID tag a classification code for the object and a type code for the recording;
means for activating the RFID tag comprises means, recorded on the recording medium, for receiving from the RFID tag in the ETA the classification code for the object and the type code for the recording;
means for retrieving the recording from storage comprises means, recorded on the recording medium, for retrieving the MIDI sequence in dependence upon the classification code for the object and the type code for the recording; and
means for playing the recording synchronously comprises means, recorded on the recording medium, for instructing a MIDI sequencer to turn on a MIDI channel and means, recorded on the recording medium, for sending the MIDI sequence through the sequencer to a multitimbral MIDI synthesizer.

15. The computer program product of claim 11 wherein:
means for storing a recording of a sound comprises means, recorded on the recording medium, for storing the recording as a MIDI sequence;
the computer program product further comprises means, recorded on the recording medium, for storing on the RFID tag a classification code for the object;
the computer program product further comprises means, recorded on the recording medium, for storing in the ETA a type code for the recording;
means for activating the RFID tag comprises means, recorded on the recording medium, for receiving from the RFID tag in the ETA the classification code for the object;
means for retrieving the recording from storage comprises means, recorded on the recording medium, for retrieving the MIDI sequence in dependence upon the classification code for the object and the type code for the recording; and
means for playing the recording synchronously comprises means, recorded on the recording medium, for instructing a MIDI sequencer to turn on a MIDI channel and means, recorded on the recording medium, for sending the MIDI sequence through the sequencer to a multitimbral MIDI synthesizer.

* * * * *